United States Patent [19]
Romagnoli

[11] Patent Number: 6,102,189
[45] Date of Patent: Aug. 15, 2000

[54] DEVICE FOR POSITIONING PRODUCTS IN SUCCESSION AND SPACED EQUALLY APART ON A CONVEYOR BELT

[75] Inventor: Andrea Romagnoli, San Lazzaro di Savena, Italy

[73] Assignee: Tecnomeccanica S.r.l., Bologna, Italy

[21] Appl. No.: 09/271,937

[22] Filed: Mar. 18, 1999

[30] Foreign Application Priority Data

Mar. 27, 1998 [IT] Italy .................................. BO98A0205

[51] Int. Cl.[7] .................................................. B65G 47/31
[52] U.S. Cl. ....................................... 198/461.1; 198/459.2
[58] Field of Search ............................. 198/459.1, 459.2, 198/461.1, 419.2

[56] References Cited

U.S. PATENT DOCUMENTS 2,991,869   7/1961   Packman et al. ................. 198/459.2 X
4,195,723   4/1980   Loewenthal .......................... 198/461.1
4,261,457   4/1981   Van Maanen ......................... 198/459.2

*Primary Examiner*—James R. Bidwell
*Attorney, Agent, or Firm*—Fay, Sharpe, Fagan, Minnich & McKee, LLP

[57] ABSTRACT

A device for positioning products in succession and equally spaced on a conveyor belt comprises: a first rotor which rotates about a fixed horizontal axis of rotation, with a radial pusher which, when the first rotor rotates, intercepts the back of a product, accelerating it along a feed line towards the conveyor belt; and a second rotor which rotates about a fixed axis of rotation parallel with the axis of the first rotor and has a stop which, when the second rotor rotates, periodically intercepts the product feed line. The second rotor is located above the conveyor belt and rotates in such a way that, when it intercepts the feed line, it causes the stop to rotate at a peripheral speed identical to the belt feed speed. The stop on the second rotor intercepts the products accelerated by the first rotor, slowing them and depositing them on the belt in succession and spaced equally apart.

3 Claims, 2 Drawing Sheets

DEVICE FOR POSITIONING PRODUCTS IN SUCCESSION AND SPACED EQUALLY APART ON A CONVEYOR BELT

BACKGROUND OF THE INVENTION

The present invention relates to a device for positioning products in succession and spaced equally apart on a conveyor belt.

In numerous production technologies, such as those for the automatic packaging of many products, it is often necessary to arrange the continuously fed products in succession, at a precise regular distance from one another, for example to feed a packaging machine.

Prior art reports many devices used to do this, the most common being devices equipped with conveyor belts which, combined in various ways, operate at different speeds, suitably selected to allow the desired succession of products.

The mechanics of such devices are generally quite complex, making their construction and operation expensive and often creating disadvantages in terms of the size of the machines which use them.

The aim of the present invention is, therefore, to overcome the above-mentioned disadvantages by providing a device with a simpler construction design which is, as a result, less expensive to make.

SUMMARY OF THE INVENTION

In accordance with the present invention, this aim is fulfilled by a device for positioning products in succession in such a way that they are spaced equally apart on a conveyor belt. The device comprises a first rotor which rotates about a fixed horizontal axis of rotation and has at least one radial pusher which, when the first rotor rotates, intercepts the back of each product, accelerating it along a product feed line towards the conveyor belt; and a second rotor which rotates about a fixed axis of rotation, parallel with the axis of the first rotor and has at least one stop which, when the second rotor rotates, intercepts the product feed line, said second rotor being positioned above the conveyor belt and rotating in such a way that, when it intercepts the feed line, it causes the stop or stops to rotate at a peripheral speed identical to the belt feed speed, said stop or stops on the second rotor intercepting the products accelerated by the first rotor, slowing them and depositing them on the belt one after another and spaced equally apart.

BRIEF DESCRIPTION OF THE DRAWINGS

Further characteristics and advantages of the invention are apparent from the detailed description which follows, with reference to the accompanying drawings, which illustrate a preferred embodiment of the invention and in which.

DESCRIPTION OF THE PREFERRED EMBODIMENTS

Figure 1:
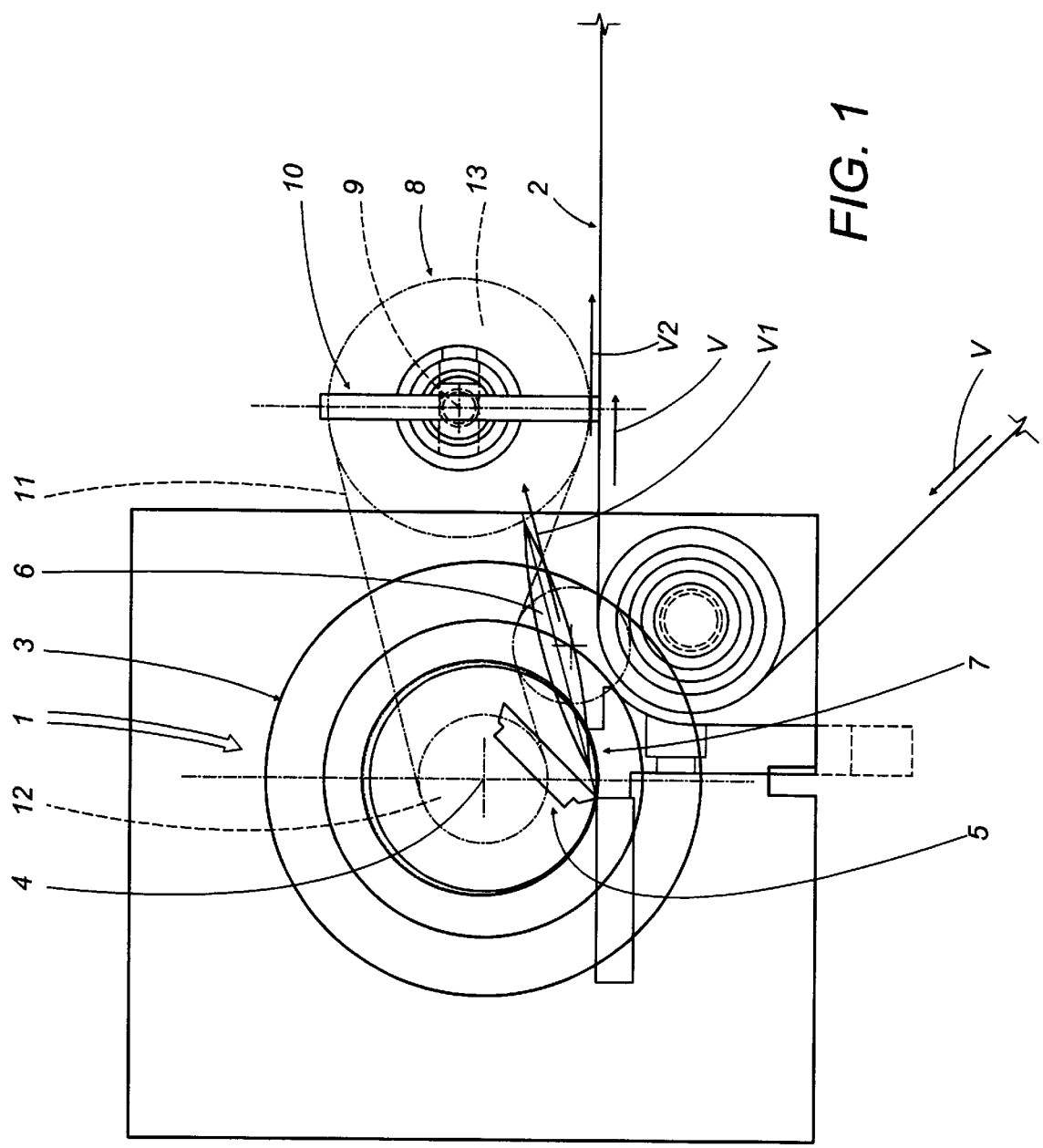
FIG. 1 is a schematic elevation assembly view of the device.

With reference to the accompanying drawings, the numeral 1 indicates as a whole a device for positioning generic products 6 in succession, equally spaced on a conveyor belt 2, partially illustrated in the drawings.

The device 1 basically comprises a first and a second rotor 3, 8 attached to one end of the conveyor belt 2 and driven in phase with one another by a drive comprising a flexible element 11, such as a toothed belt looped around a pair of pulleys 12, 13, also toothed, which respectively connect the two rotors 3, 8.

The first rotor 3 rotates about a fixed horizontal axis of rotation 4 and has a radial pusher 5 which, when the first rotor 3 rotates, intercepts the back of each product 6 which is individually fed upstream of the device 1. Each product 6, when intercepted by the pusher 5, is accelerated along a product 6 feed line 7 towards the conveyor belt 2.

The second rotor 8 rotates about a fixed axis of rotation 9 parallel with the axis 4 of the first rotor 3 and is equipped with a stop 10, consisting of a flat blade which, when the second rotor 8 rotates, periodically intercepts the product 6 feed line 7.

Figure 2:
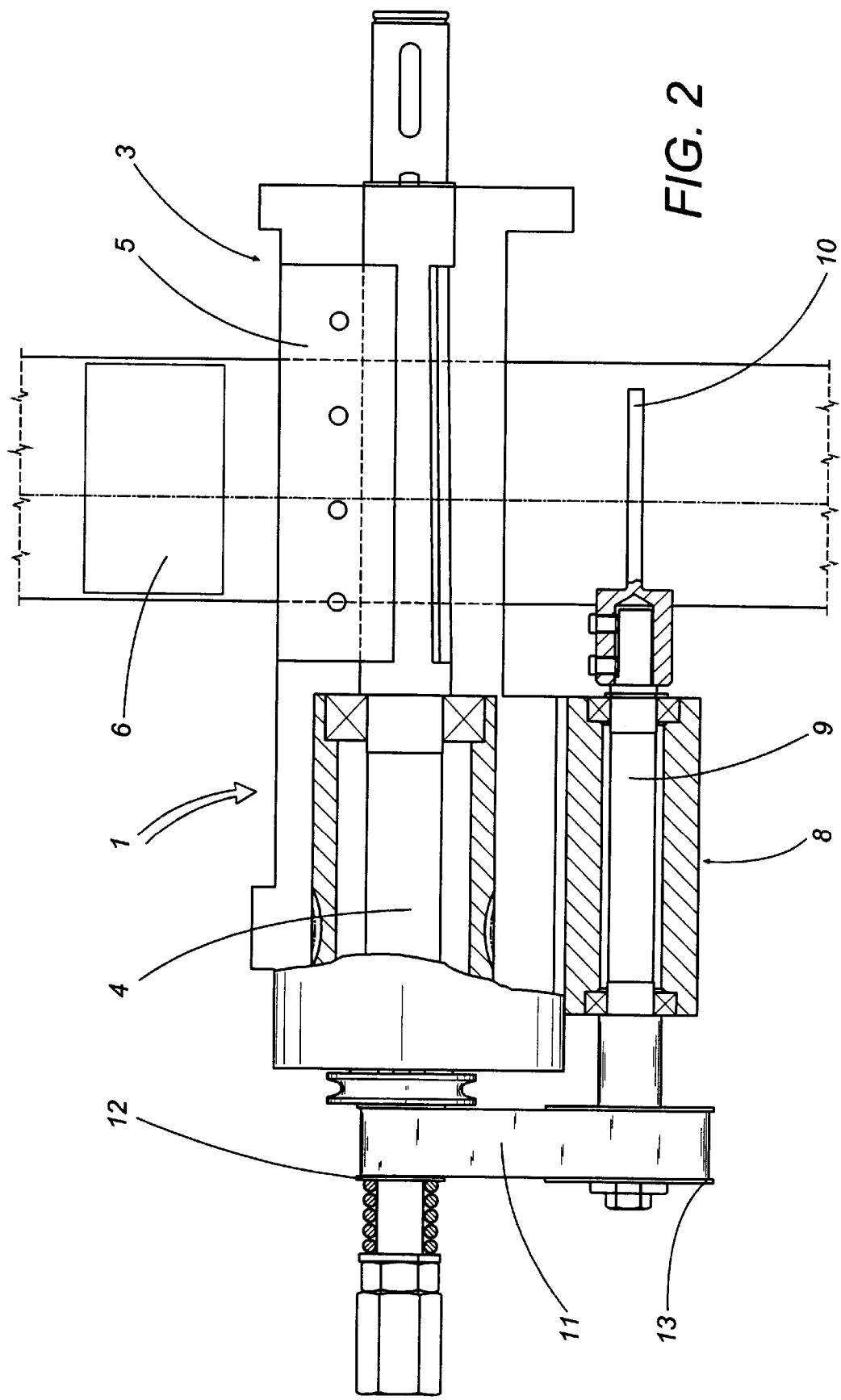
FIG. 2 is a top plan view of the device illustrated in FIG. 1.

The second rotor 8 is located downstream of the first rotor 3, above the conveyor belt 2 and rotates in such a way as to impart to the stop 10 a peripheral speed V2 identical to the feed speed V of the belt 2. Since the peripheral speed of the pusher 5 is greater than the peripheral speed V2 of the stop 10, the products 6 accelerated by the first rotor 3 and fed at a speed V1 are intercepted by the stop 10, slowed to speed V2 and deposited on the belt 2 in succession, spaced equally apart and at the same speed V as the belt 2 (see also FIG. 2).

In the embodiment of the device 1 described above, no reference is made to the type of products 6 positioned, which may be of diverse geometric shapes, nor is any reference made to the methods used to feed the products 6 towards the device 1, which may envisage, for example, feeding the products 6 in succession one by one.

If the radial pusher 5 also comprises a cutter (as illustrated in FIG. 1), the device 1 may also be used to prepare the products 6 upstream of positioning. It is clear that such a radial pusher 5, supplied with a continuous stream of unfinished products, interacting with the feed line 7, could produce sections of products 6 which could then be sent to and positioned on the conveyor belt 2 using methods identical to those previously described.

The above description shows that a device 1 made according to the present invention fulfils the aims indicated and provides a simple, economical and highly reliable solution which is also compact; it is also very versatile and, therefore, suitable for general use.

The present invention may be subject to numerous variations, all encompassed by the original design concept. Moreover, all parts may be substituted with technically equivalent elements.

What is claimed:

1. A device for positioning products in succession and equally spaced on a conveyor belt, comprising a first rotor, rotating about a fixed axis of rotation and having at least one pusher which, when the first rotor rotates, intercepts the back of each product, accelerating the product along a product feed line towards the conveyor belt; and a second rotor, rotating about a fixed axis of rotation parallel with the axis of the first rotor and having at least one stop which, when the second rotor rotates, intercepts the product feed line, said second rotor being located above the conveyor belt and rotating in such a way that, when it intercepts the feed line, it causes the stop or stops to rotate at a peripheral speed identical to the belt feed speed, said stop or stops on the second rotor intercepting the products accelerated by the first rotor, slowing them and depositing them on the belt in succession and spaced equally apart.

2. The device according to claim 1, wherein the pusher comprises a cutter which, when the first rotor rotates, separates a product from an uninterrupted row of products fed upstream of the pusher.

3. The device according to claim 2, wherein the first and second rotors are driven in phase with one another by a drive comprising a flexible element looped around a pair of pulleys, respectively connecting the rotors.

* * * * *